(12) United States Patent
Swietlik et al.

(10) Patent No.: US 7,377,337 B2
(45) Date of Patent: May 27, 2008

(54) DOWNHOLE DRILLING TOOL

(75) Inventors: George Swietlik, Lowestoft (GB);
Christopher David Down, Lowestoft (GB)

(73) Assignee: Pilot Drilling Control Limited, Lowestoft (GB)

( * ) Notice: Subject to any disclaimer, the term of this patent is extended or adjusted under 35 U.S.C. 154(b) by 96 days.

(21) Appl. No.: 11/033,576

(22) Filed: Jan. 12, 2005

(65) Prior Publication Data
US 2006/0151216 A1 Jul. 13, 2006

(30) Foreign Application Priority Data
Jan. 15, 2004 (GB) ................. 0400892.6

(51) Int. Cl.
*E21B 17/04* (2006.01)
*E21B 4/00* (2006.01)
(52) U.S. Cl. ...................... 175/101; 175/320
(58) Field of Classification Search .............. 175/101, 175/320, 107; 192/45
See application file for complete search history.

(56) References Cited

U.S. PATENT DOCUMENTS

| 2,167,019 | A | * | 7/1939 | Yost | ............ 175/101 |
| 2,915,156 | A | * | 12/1959 | Horn | ........ 192/41 R |
| 2,978,047 | A | * | 4/1961 | De Vaan | ........ 175/258 |
| 3,432,016 | A | | 3/1969 | Votg | |
| 3,767,019 | A | * | 10/1973 | Wingler | ........ 192/45 |
| 4,232,751 | A | | 11/1980 | Trzeciak | |
| 4,276,944 | A | | 7/1981 | Geczy | |
| 4,295,535 | A | | 10/1981 | Crase et al. | |
| 4,386,666 | A | | 6/1983 | Crase et al. | |
| 4,427,079 | A | * | 1/1984 | Walter | ........ 175/106 |
| 4,901,836 | A | | 2/1990 | Stenmark et al. | |
| 5,350,242 | A | * | 9/1994 | Wenzel | ......... 384/97 |
| 6,073,741 | A | * | 6/2000 | Liu | .............. 192/45 |
| 6,182,774 | B1 | * | 2/2001 | Tibbits | ........ 175/276 |
| 7,121,391 | B2 | * | 10/2006 | Kuo | ............. 192/45 |
| 2004/0045783 | A1 | * | 3/2004 | Lew et al. | ........ 192/64 |

FOREIGN PATENT DOCUMENTS

| CA | 2256069 A1 | 6/2000 |
| GB | 532740 A | 1/1941 |
| GB | 2303658 A | 2/1997 |
| JP | 08177888 A | 7/1996 |
| JP | 08291782 A | 11/1996 |
| WO | WO 02/35111 A1 | 5/2002 |
| WO | WO2005/003505 A1 | 1/2005 |

* cited by examiner

*Primary Examiner*—David J. Bagnell
*Assistant Examiner*—David Andrews
(74) *Attorney, Agent, or Firm*—Seyfarth Shaw LLP

(57) ABSTRACT

A downhole drilling tool 136 comprises a drillstring 138, a drilling head 140, and a freewheel 144 for transferring drive from the drillstring to the drilling head. The freewheel 144 is positioned between the drillstring 138 and the drilling head 140.

10 Claims, 13 Drawing Sheets

SECTION A-A

DETAIL B

DOWNHOLE DRILLING TOOL

TECHNICAL FIELD OF THE INVENTION

The invention relates to a downhole drilling tool for drilling an oil well, and in particular to a downhole drilling tool that can transmit a high torque without slipping in a downhole drilling operation.

BACKGROUND TO THE INVENTION

When drilling a well bore using a downhole drilling tool including a downhole motor, the drilling head can become snagged or stuck on the rock formation. In order to free the drilling head it is necessary to apply a very large torque to the drilling head, which is much larger than the torque available from the downhole motor. Therefore the torque must be applied to the drilling head from the surface through the drillstring.

If this is not possible, or the drilling head cannot be freed, then the downhole motor and drilling head have to be abandoned in the well bore, and the direction of the well bore diverted around the abandoned drilling head. This is extremely time consuming and expensive.

It is a problem that in a typical downhole motor, of the turbine type, there is no convenient way of transferring the torque of the drillstring to the drilling head, save for effectively jamming the mud motor or turbine shaft to the motor housing, which is connected to the drillstring. The housing of the turbine is mounted to the end of the drillstring, and therefore torque applied to the drillstring can be passed through the housing of the turbine. In one known method, metal balls or spheres are pumped down the centre of the drillstring to the turbine in the pressurized mud flow, which on reaching the turbine, lodge in cavities between the housing and the drive shaft of the turbine. The cavities are positioned and shaped such that when the housing is rotated in the drilling direction relative to the drilling head, the balls are forced into locking engagement with the housing and shaft, thus locking them together. The torque of the drillstring applied at the surface is therefore passed through the shaft to the drilling head and the required passage of fluid through the drillstring is not compromised.

A disadvantage of this method is that the torque from the drillstring is passed substantially through the whole length of the shaft of the turbine, which is primarily designed to transfer the torque generated by the turbine alone. The torque passed through the drillstring is significantly greater, and this can cause the shaft to fail, if the drilling head proves unmovable.

A further disadvantage of this method is that even if the drilling head is released from the rock formation, then the turbine and drilling head must be withdrawn to the surface to facilitate removal of the locking balls, before drilling can be resumed.

SUMMARY OF THE INVENTION

According to a first aspect of the present invention, there is provided a downhole drilling tool comprising a drillstring and a drilling head, wherein a freewheel for transferring drive from the drillstring to the drilling head is positioned between the drillstring and the drilling head.

The freewheel may be positioned at any point in the drive train between the drillstring and the drilling head. Preferably, the freewheel is provided in a downhole motor assembly which transfers drive to the drilling head.

A freewheel device links a driving member, that is, a member providing a driving force or torque, to a driven member. A freewheel device is designed so that, when the rotational speed of the driving member is greater than the rotational speed of the driven member, the freewheel locks the driving and driven members together so the torque driving the driving member is transmitted to the driven member. When the rotational speed of the driving member is less than the rotational speed of the driven member, the freewheel allows the driven member to rotate freely of the driving member. Requirements of a freewheel device of the invention are that the freewheel locks quickly when a sufficient torque is applied, and that the freewheel does not slip when subjected to very high torques.

In some types of freewheel devices, the locking and unlocking action is achieved by jamming one or more rollers or ball bearings between the driving and driven members, and by releasing them respectively. The rollers or ball bearings are located between a pair of races, with one race being formed on the driving member and the other race being formed on the driven member. One of the races is designed so that, when a sufficient torque is applied to the driving member, sloped faces on the race bear against the rollers or ball bearings, so that they are jammed between the sloped faces and the race formed on the driven member. Torque is therefore transmitted through the rollers or ball bearings from the driving member to the driven member. When the driving force or torque reduces, the rollers or ball bearings are released, allowing the driven member to rotate freely of the driving member.

However, if the driving force or torque is particularly large, for example in a downhole turbine or other downhole drilling tool, the rollers or ball bearings may slip from their jammed positions, causing the freewheel to unlock. Although the freewheel will re-lock when the rollers or ball bearings again jam between the sloped faces and the race formed on the driven member, the slipping of the freewheel may result in excessive wear or damage to the freewheel or to the driving or driven machinery.

There is therefore a need for a freewheel device that locks quickly when a driving torque is applied, and which is less susceptible to the locking elements slipping at high torques. There is also a need to allow the free passage of fluid through the device.

Therefore in a second aspect of the present invention, there is provided a freewheel, comprising:
 a first race;
 a second race; and
 a locking element interposed between said first and second races;
 one of said races having a wedge-shaped portion upon which the locking element moves between a disengaged position in which the first race is disengaged from the second race and an engaged position in which the locking element locks the first and second races together, and the other of said races having a depression formed in a surface thereof, the depression being shaped to receive at least a portion of the locking element when the locking element is in the engaged position.

Preferably, the other of said races has a plurality of depressions formed in the surface thereof.

Preferably, the one of said races has a plurality of wedge-shaped portions formed on the surface thereof, and the freewheel further comprises a plurality of locking elements interposed between the first and second races.

The locking elements may comprise ball bearings or rollers.

Preferably, where the locking elements are ball bearings, the wedge-shaped portion or portions are formed in the end face of the first race, and the depression or depressions are formed in the end face of the second race.

Preferably, the one or more depressions are grooves that extend in a generally circumferential direction relative to the axis of rotation of the driven member.

Preferably, the one or more wedge-shaped portions are curved in a generally circumferential direction relative to the axis of rotation of the driving member.

Alternatively when the locking elements are ball bearings, or when the locking elements are rollers, the depression may be a recess or a groove extending in a direction parallel to the axis of rotation of the driving and driven members. Alternatively, the depression may comprise a hole with a radial axis, or a hole with an axis offset from a radial direction.

Preferably, the wedge-shaped portion or portions are formed on the first race, and the depression or depressions are formed on the surface of the second race.

In a third aspect of the invention, there is provided a freewheel, comprising:

a first race having a resilient latching member; and
a second race having at least one recess therein;
the resilient latching member of the first race being adapted to engage the at least one recess of the second race for transferring drive from one of the races to the other.

Preferably, the resilient latching member is integral with the first race.

Preferably, the resilient latching member is formed by providing a slit which extends from an edge of the first race substantially circumferentially through the first race.

Preferably, a plurality of recesses are provided in the second race.

Preferably the or each recess is asymmetric, and includes a substantially radial face for engaging the end of the resilient latching member.

Preferably the first race is positioned within the second race and the resilient latching member is biased radially outwards towards the second race.

Alternatively, the first race is positioned around the second race and the resilient latching member is biased radially inwards towards the second race.

At least one aperture may be provided axially through the first race. Preferably, a plurality of apertures are provided axially through the first race to allow for the free passage of fluid through the device.

In a fourth aspect of the invention, there is provided a freewheel, comprising:

a first race;
a second race;
a locking ring interposed between the first race and the second race, and at least one locking element retained partly in a recess of the first race and partly in a recess of the locking ring, in use, the locking element moving between a locked position in which the locking ring is forced into engagement with the second race and a release position in which the locking ring is released from the second race.

In a fifth aspect of the invention, there is provided a freewheel, comprising:

a first race;
a second race;
a guide ring interposed between the first race and the second race, and at least one locking element retained partly in a recess of the first race and partly in a recess of the guide ring, in use, the locking element moving between a locked position in which the locking element is forced into engagement with the second race and a release position in which the locking element is released from the second race.

In a sixth aspect of the invention, there is provided a freewheel, comprising:

a shaft mounted for rotation within a housing, a resilient coil mounted about the shaft disposed between the shaft and the housing, a drive element provided on the shaft and a drive element provided on the housing, in use, the resilient coil moving between a locked position in which first and second ends of the coil engage the drive elements of the shaft and housing respectively and a release position in which the coil rotates freely between the drive elements.

In a seventh aspect of the invention, there is provided a freewheel, comprising:

a shaft mounted for rotation within a housing, a cylinder mounted about the shaft disposed between the shaft and the housing, the cylinder having radially disposed drive faces, a drive element provided on the shaft and a drive element provided on the housing, in use, the cylinder moving between a locked position in which the drive faces of the cylinder engage the drive elements of the shaft and housing respectively and a release position in which the cylinder rotates freely between the drive elements.

An eighth aspect of the invention relates to a freewheel, and in particular to a drillstring freewheel that can transmit a high torque without slipping in a downhole drilling operation.

It is an advantage of all of the embodiments of the invention that fluid can flow through the freewheel.

It is an advantage of the invention that the drillstring can transmit a high torque to the drilling head in one direction without slipping, but allows slippage in the other direction. This prevents reverse drillstring rotation occurring when the drilling head becomes stuck on the rock formation.

BRIEF DESCRIPTION OF THE DRAWINGS

The invention will now be described with reference to the following drawings, in which.

DETAILED DESCRIPTION OF THE PREFERRED EMBODIMENTS

Figure 18:
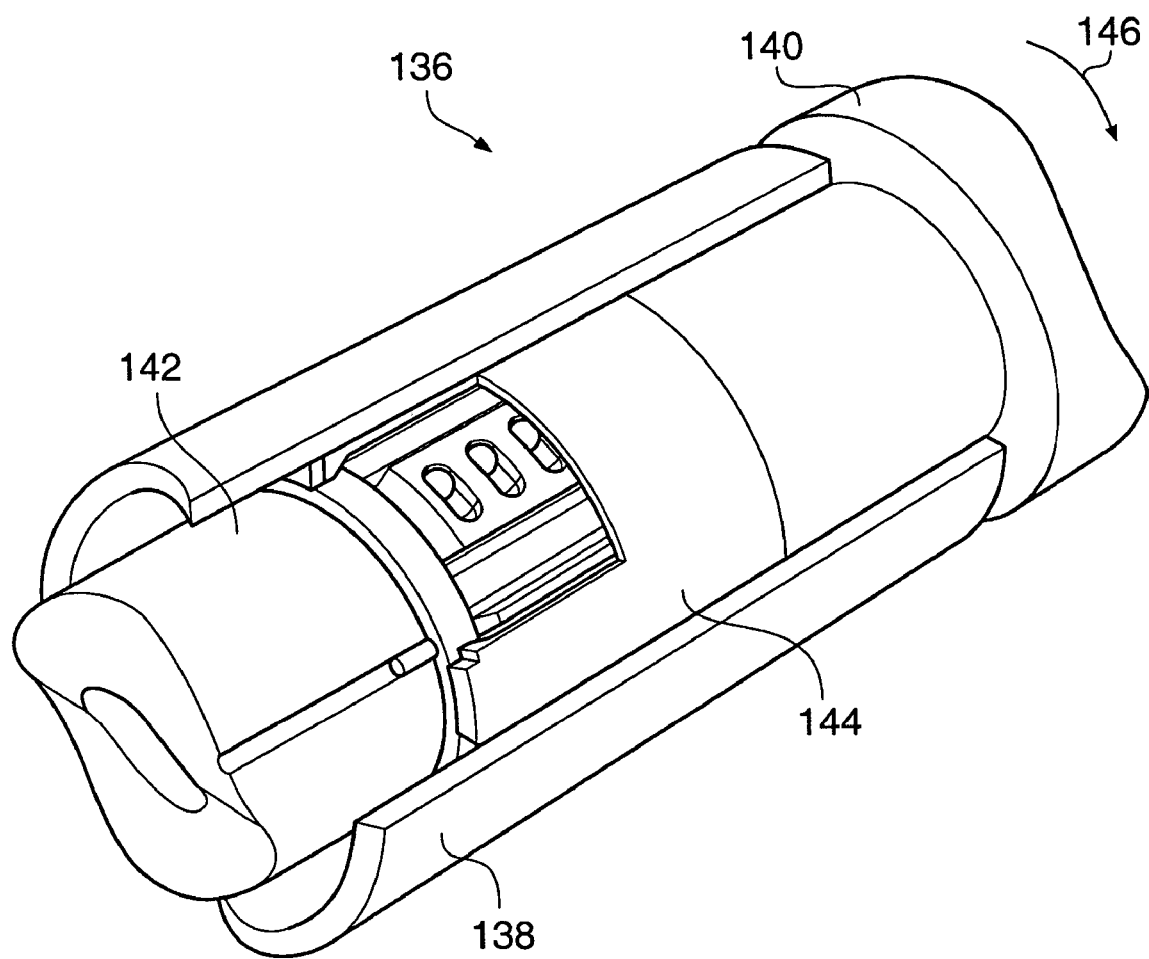
FIG. 18 shows a perspective view of part of a drilling tool, with the drillstring cut-away to reveal the freewheel, which is also shown partly cut-away.

Referring firstly to FIG. 18, part of a drilling tool is indicated generally at 136. The tool comprises a drillstring element or housing 138, a drilling head 140 represented by a connecting flange, a drive shaft 142 of a downhole mud motor and a free wheel 144 positioned between the drillstring 138 and the drive shaft 142 of the mud motor.

The drive shaft 142 of the downhole mud motor extends downwards through the drillstring 138 from the motor to the drilling head, and provides drive to the drilling head. The downhole motor is attached to the drillstring 138, and so the drive shaft 142 and drilling head 140 rotate relative to the drillstring 138. When drilling, the drillstring 138 rotates slowly, for example, in the direction indicated by the arrow 146. The downhole motor drives the drilling head 140 through the drive shaft 142, also in the direction indicated by the arrow 146, relative to the drillstring 138. In other words, the drilling head 140 is rotating in the direction 146 faster than the drillstring relative to the rock face. The freewheel 144 free wheels, thus allowing the relative rotation of the shaft 142 to the drillstring 138.

However, if the drilling head 140 becomes snagged or stuck on the rock formation and the downhole motor is stopped, the drillstring continues rotating in the direction 146 and the freewheel locks, thus transferring drive directly from the drillstring 138 to the shaft of the drilling head. A much higher torque can be transmitted through the drillstring 138 than by the downhole motor, which enables the drilling head 140 to be driven free.

Once freed, the downhole motor is once again able to drive the drilling head, the speed of the drilling head increases and the freewheel unlocks and free wheels.

In an alternative arrangement (not shown) the freewheel may be positioned within the downhole motor assembly. Nevertheless, it is preferable to position the freewheel as close to the drilling head as possible, so that the shaft driving the drilling head from the downhole motor does not have to withstand high torques over unnecessary length, increasing the risk of a failure in the shaft.

In the following description, a number of embodiments of freewheel are described which are suitable for transferring drive from the drillstring 138 to the drilling head 140 in a downhole drilling tool. References to the driving member and driven member relate to parts of the drillstring and drilling head respectively.

In FIGS. 1 to 6, like elements are represented by the same reference numerals.

Figure 1:
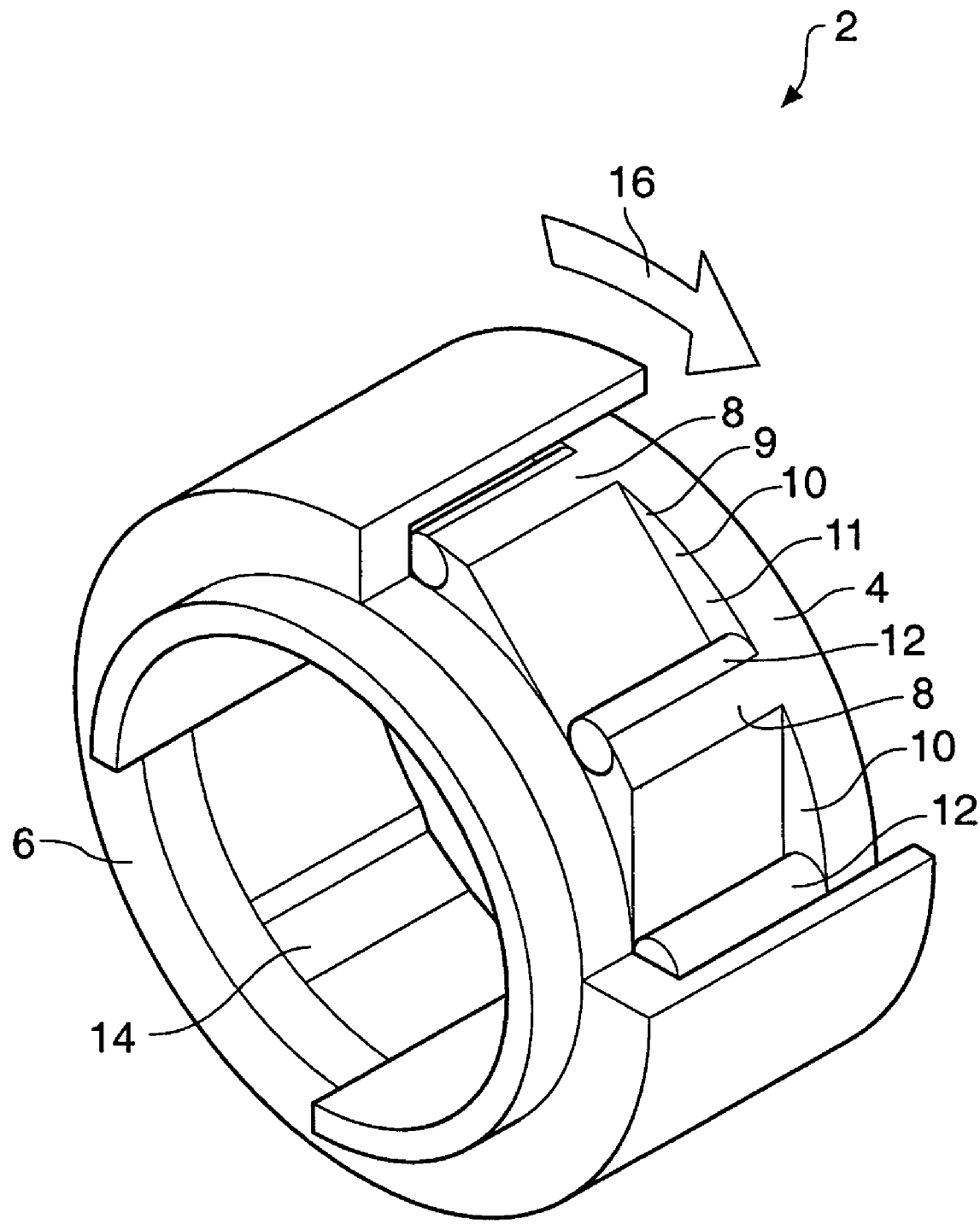
FIG. 1 is a perspective view of the freewheel according to a first embodiment of the invention with a portion of the inner and outer races removed to show the locking elements in disengaged positions.
Figure 3:
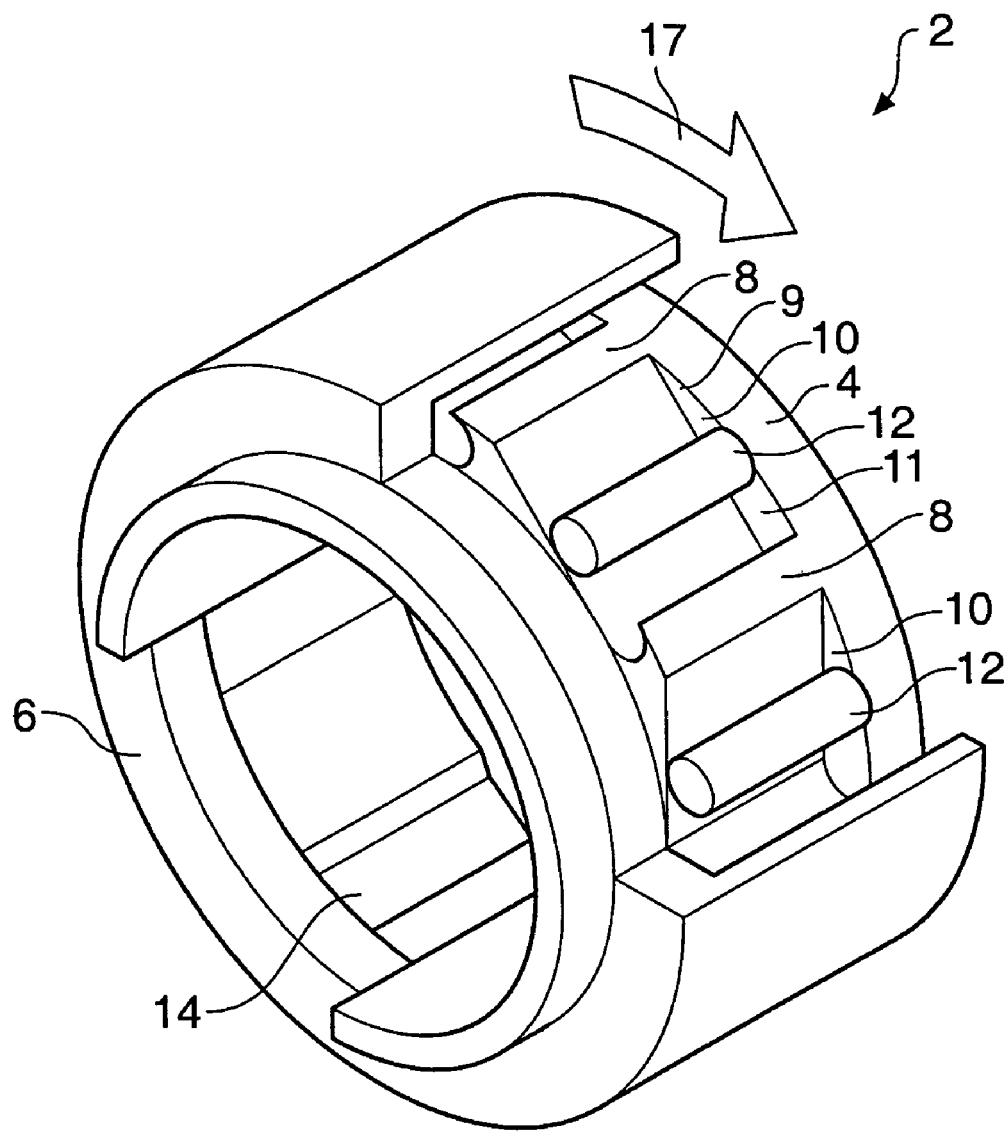
FIG. 3 is a perspective view of the freewheel of FIGS. 1 and 2 with a portion of the inner and outer races removed to show the locking elements in engaged positions.
Figure 4:
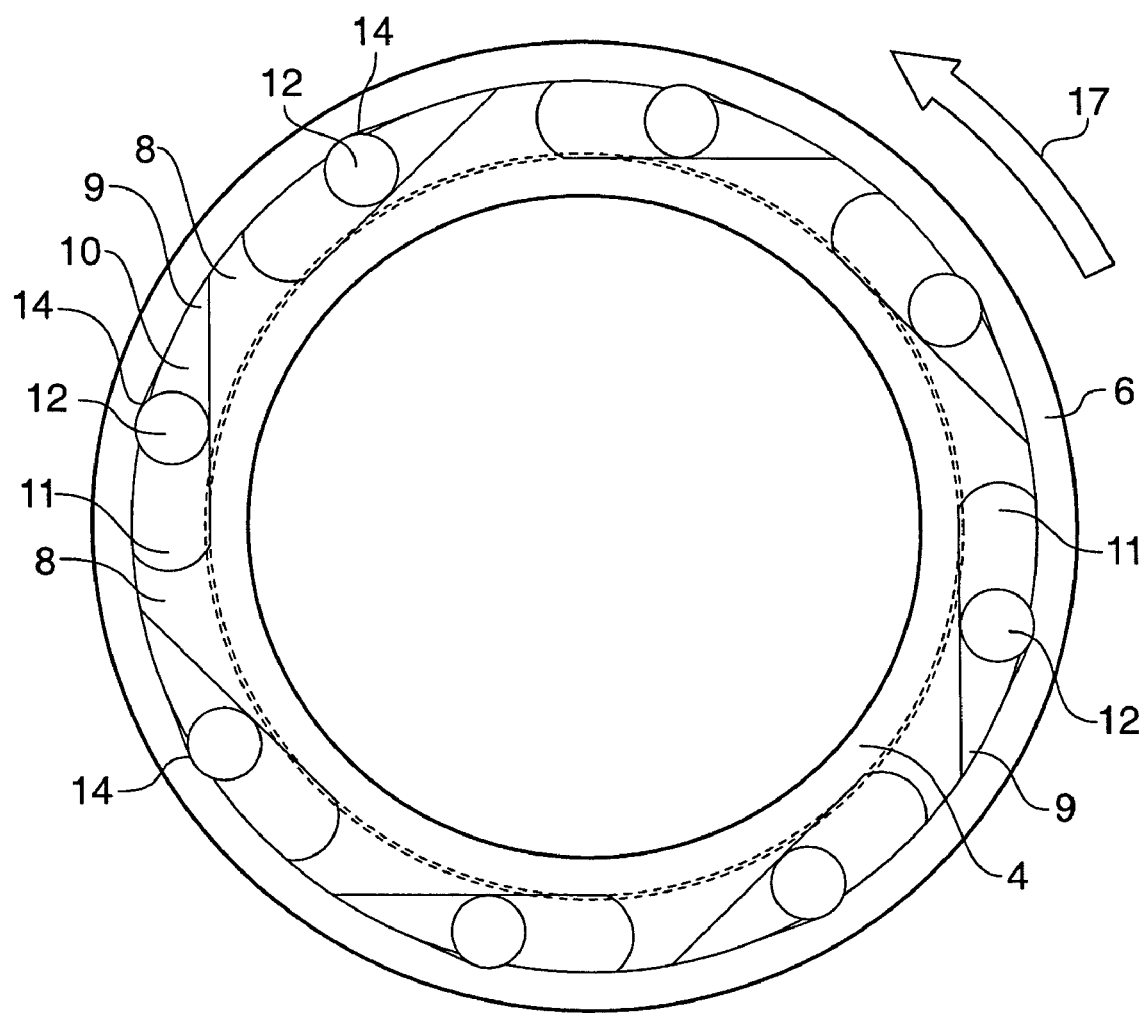
FIG. 4 is a cross-section through the freewheel of FIG. 3, showing the locking elements in engaged positions.

FIGS. 1 and 3 are perspective views of a first embodiment of a freewheel, in which the freewheel is unlocked and locked respectively.

The freewheel 2 comprises a first circular race 4, which in this illustrated embodiment is the inner race, around which is located a second circular race 6. The first race 4 and second race 6 have a common axis of rotation. The first race 4 is formed on a driving member (not shown) and the second race 6 is formed on a driven member (also not shown). In FIGS. 1 and 3, a portion of the first race 4 has been cut away to show the structure of the second race 6, and a portion of the second race 6 has been cut away to show the structure of the first race 4.

A number of wedge-shaped portions 8 are located on the outer surface of the first race 4. These wedge-shaped portions 8 define, with the inner surface of the outer race 6, a number of tapering spaces 10 between the first race 4 and second race 6. The tapering spaces taper from a narrow end 9 to a wide end 11.

Interposed between the first race 4 and second race 6, and, when the freewheel is unlocked, located in the wide end 11 of each tapering space 10, is a locking element 12. Preferably, each of the locking elements 12 are of equal size, and have a diameter such that, when the locking element 12 is located in the wide end 11, the locking element 12 is not in contact with both the first race 4 and second race 6.

In this illustrated embodiment, each of the locking elements 12 is a roller. In the second embodiment illustrated in FIGS. 5 and 6, the locking elements 12 are ball bearings.

Figure 6:
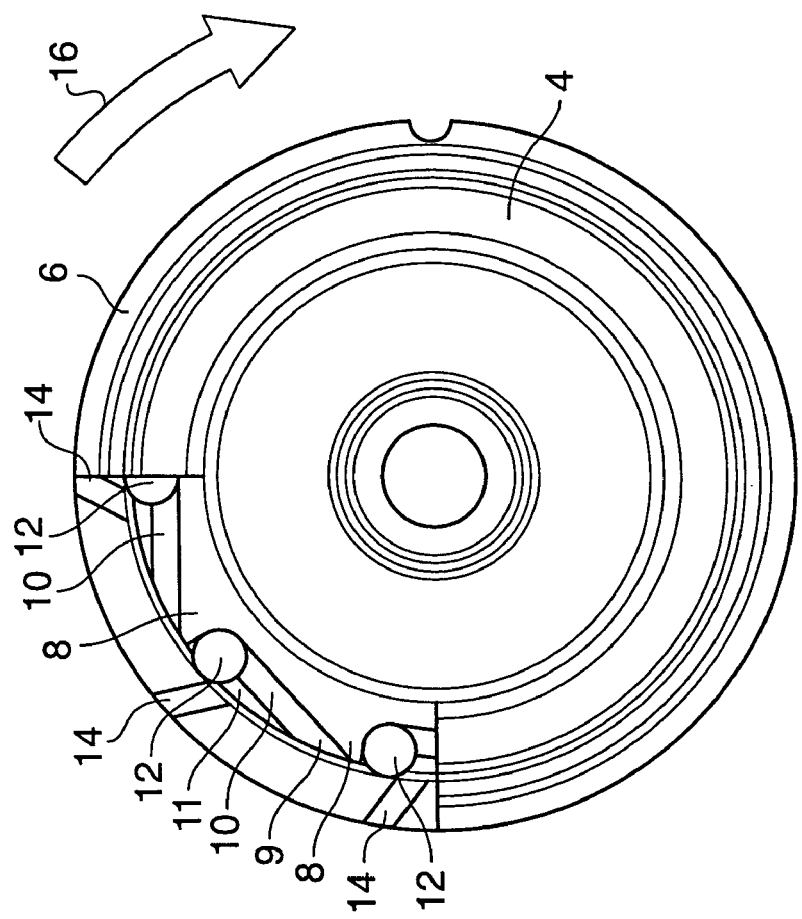
FIG. 6 is a cross-section through the freewheel of FIG. 5, showing the locking elements in disengaged positions.
Figure 5:
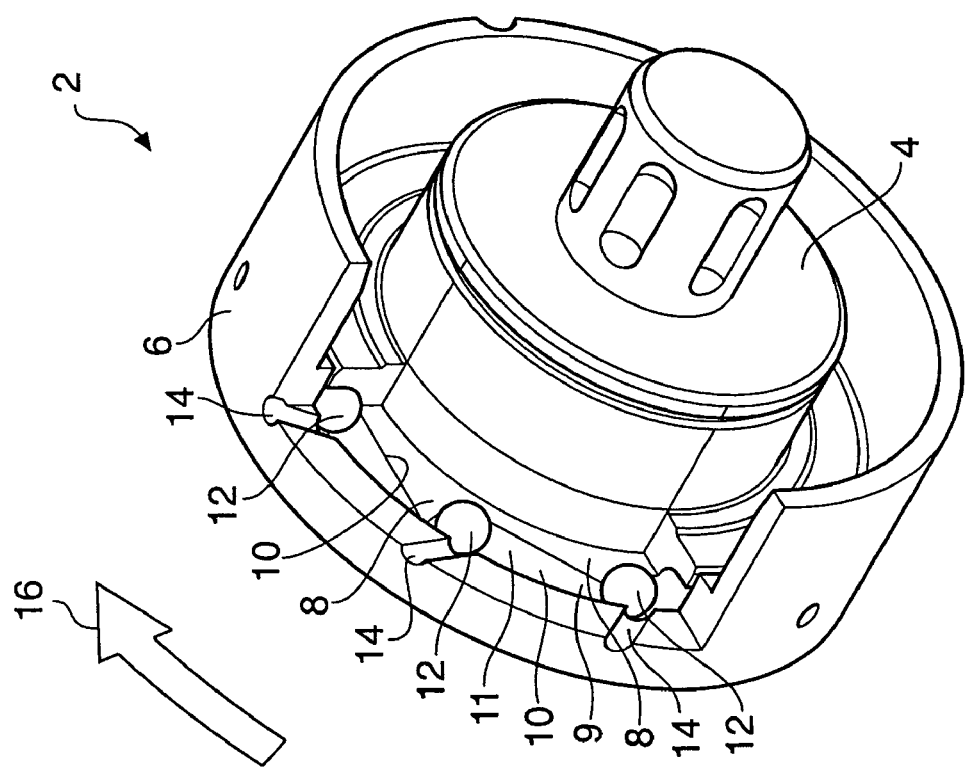
FIG. 5 is a perspective view of a freewheel according to a second embodiment of the invention with a portion of the inner and outer races removed to show the locking elements in disengaged positions.

One or more depressions 14 are formed in the inner surface of the second race 6. These depressions 14 are shaped to receive at least a portion of a locking element 12. Therefore, where the locking elements 12 are rollers, the depressions 14 may be grooves in the inner surface of the second race 6, which extend in a direction that is parallel to the axis of rotation of the first race 4 and second race 6 (as shown in FIGS. 1 and 3). Where the locking elements 12 are ball bearings, the depressions 14 may be circular recesses in the inner surface of the second race 6. Alternatively, the depressions 14 may be holes drilled or cut into the second race 6, with the holes being rectangular in plan view so that they can receive a portion of a roller, or circular so that they can receive a portion of a ball bearing (as shown in FIGS. 5 and 6).

The depressions 14 are preferably equally spaced around the inner surface of the second race 6, with each wedge-shaped portion 8 on the first race 4 having a corresponding depression 14 on the second race 6.

Figure 2:
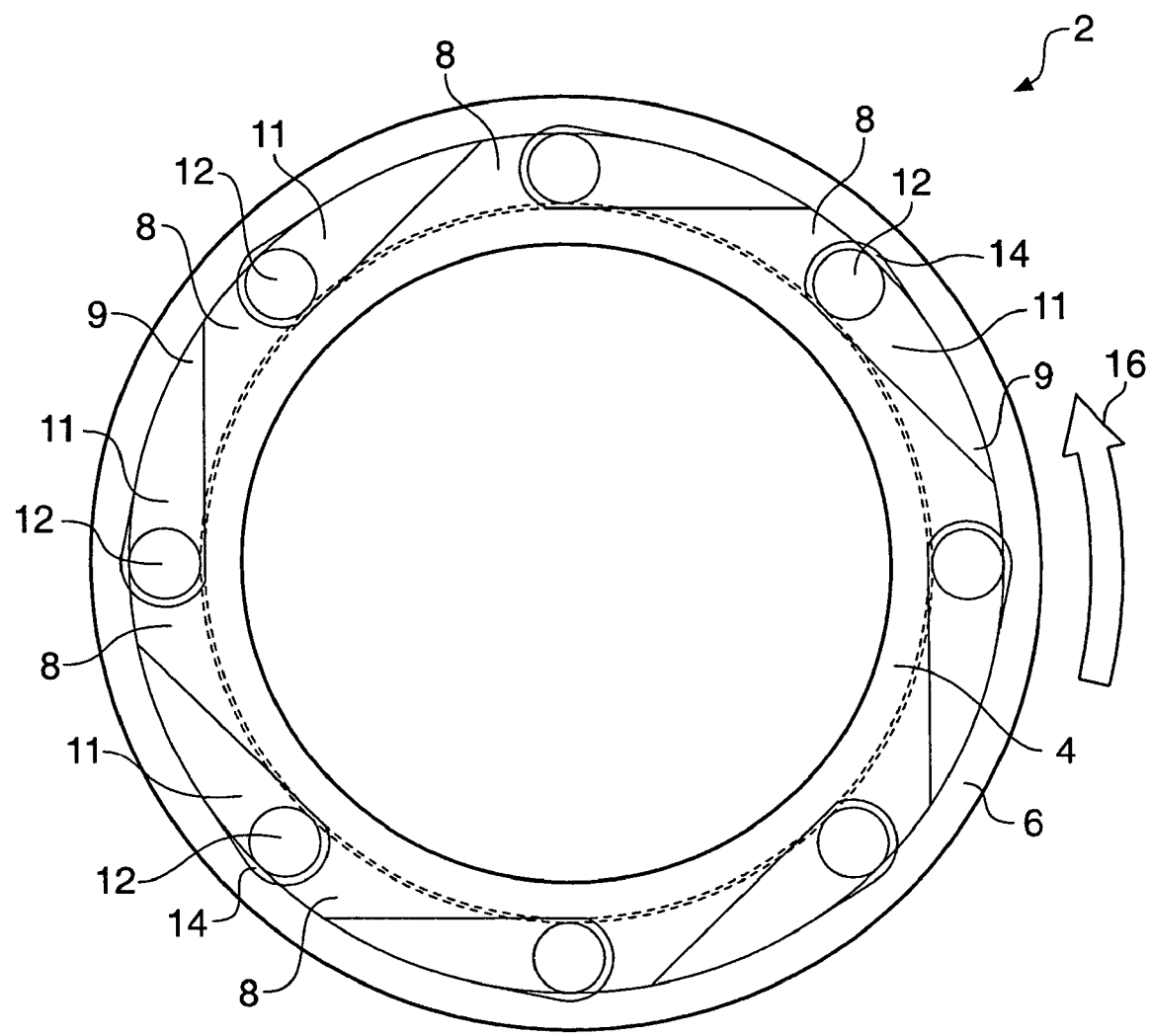
FIG. 2 is a cross-section through the freewheel of FIG. 1, showing the locking elements in disengaged positions.

When the rotational speed of the driven member is greater than the rotational speed of the driving member, the freewheel 2 is unlocked, allowing the driven member to rotate freely of the driving member. FIGS. 1 and 2 show a freewheel according to the invention with the locking elements in unlocked or disengaged positions at the wide ends 11 of respective tapering spaces 10. In these figures, arrow 16 indicates the direction that the second race 6 is rotating. The first race 4 may be stationary, or may be rotating in the same direction as, but slower than, the second race 6.

As the locking elements 12 are located in the wide ends 11, and the locking elements 12 have a diameter such that they are not able to be in contact with both the first race 4 and second race 6 whilst in the wide ends 11, the second race 6 is able to rotate freely with respect to the first race 4. Therefore, the locking elements 12 are in disengaged positions.

However, when the speed of rotation of the first race 4 increases to exceed that of the second race 6 (i.e. when the driving torque of the driving member becomes greater than the output torque of the driven member), the wedge-shaped portions 8 act on the locking elements 12 so that they are pushed towards the narrow ends 9 of respective tapering spaces 10 and are forced into contact with the inner surface of the second race 6. As the first race 4 and locking elements 12 rotate relative to the second race 6, the locking elements 12 will, upon reaching depressions 14 in the inner surface of the second race 6, be pushed into the depressions 14 by the wedge-shaped portions 8. The locking elements 12 are now held in engaged positions, and the first race 4 and second race 6 are locked with the first race 4 and second race 6 rotating at the same speed. Therefore, when the freewheel 2 is locked, torque is transmitted through the rollers from the driving member to the driven member. The locked position of the freewheel can be seen in FIGS. 3 and 4. Here, arrow 17 indicates the direction in which both races are rotating, and also indicates the direction in which the driving torque acts.

When the driving torque reduces and the speed of rotation of the first race 4 decreases relative to the speed of rotation of the second race 6, the wedge-shaped portions 8 will no longer jam the locking elements 12 into the depressions 14. Therefore, each locking element 12 is released from the respective depression 14 and is accommodated with some play in the wide ends 11 of the respective tapering space 10, allowing the second race 6 to rotate freely of the first race 4. The freewheel 2 is now back in the unlocked position as shown in FIGS. 1 and 2.

Although the invention has been described and illustrated as comprising a plurality of wedge-shaped portions, a plurality of locking elements and a plurality of depressions, it will be appreciated that a freewheel according to the present invention will function even with a single wedge-shaped portion, a single locking element and a single depression.

Although depressions are formed in the surface of the second race 6, it is still possible for the locking elements to become jammed between the wedge-shaped portions and the inner surface of the second race, as in a conventional freewheel, without the locking elements being 'engaged' in the depressions. In this case, the freewheel will partially lock up, but may still slip. Therefore, in accordance with one embodiment of the invention, the number of locking elements and number of depressions are not equal. In particular, the number of depressions is increased relative to the number of locking elements, and so that the locking elements will become jammed into the depressions immediately or with minimal relative slip between the races.

It will also be appreciated that the invention is applicable to freewheel devices where the first race formed on the driving member is the outer race, and the second race formed on the driving member is the inner race. In this case, the wedge-shaped portions are located on the outer race (i.e. on the first race) and the depressions are formed in the outer surface of the inner race. When a sufficient driving torque is applied to the first, outer race, the wedge-shaped portions act on the locking elements so that they are pushed against the outer surface of the second race. When the locking elements reach depressions in the outer surface of the inner race, the wedge-shaped portions will push the locking elements into the depressions, thus locking the first and second races, and transmitting the driving torque to the driven member.

It will also be appreciated that the present invention includes freewheels in which the or each locking element is located in the face of the driving member and moves in an axial direction to lock against the opposing face of the driven member. A freewheel according to this third embodiment of the invention is shown in FIGS. 7 to 11.

Figure 7:
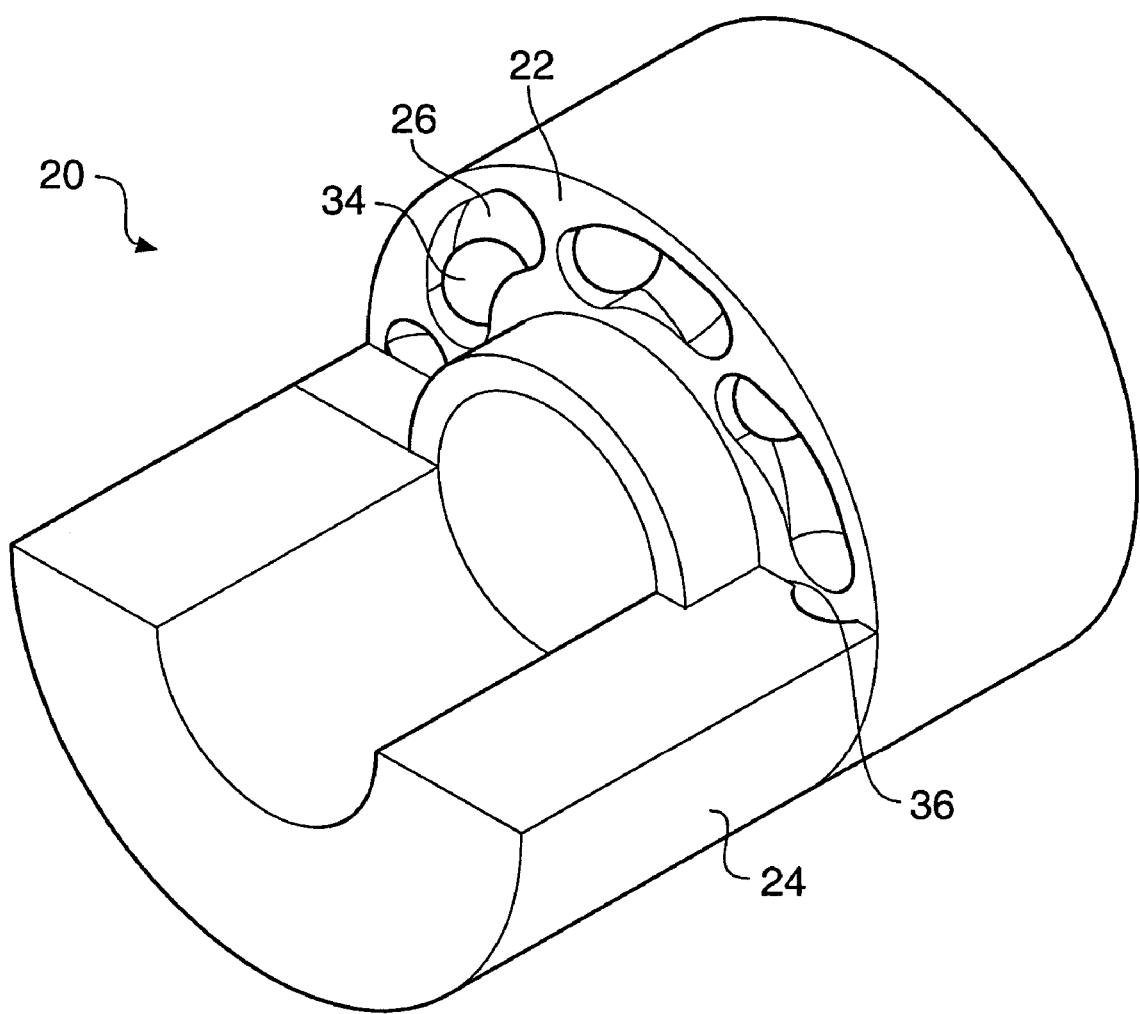
FIG. 7 is a perspective view of a freewheel according to a third embodiment of the present invention with a portion of the driven race removed to show the locking elements in disengaged positions.

The freewheel 20 comprises a first race 22 formed in the end face of a driving member adjacent to a second race 24 formed in the end face of a driven member. The first race 22 and second race 24 have a common axis of rotation. In FIG. 7, a portion of the second race 24 has been cut away to show the structure of the first race 22.

The first race 22 comprises a number of contoured wedge-shaped portions 26 set in the face of the driving member. These contoured wedge-shaped portions 26 define, with the end face of the driven member, a number of tapering spaces 28 between the first race 22 and second race 24. The tapering spaces 28 taper from a shallow end 30 to a deep end 32. This configuration can be more clearly seen in FIGS. 8 and 10.

Interposed between the first race 22 and second race 24, and, when the freewheel is unlocked, located in the deep end 32 of each tapering space 28, is a locking element 34. Each locking element 34 can move up and down its respective wedge-shaped portion 26. In a preferred embodiment, each of the locking elements 34 are of equal size, and have a diameter such that, when the locking element 34 is located in the deep end 32, the locking element 34 is not in contact with the second race 24.

In this embodiment, the locking elements 34 are ball bearings.

One or more depressions 36 are formed in the face of the second race 24. These depressions 36 are shaped to receive at least a portion of a locking element 34. Therefore, as the locking elements 34 are ball bearings, the depressions 36 are tapered grooves in the face of the second race 24.

Figure 9:
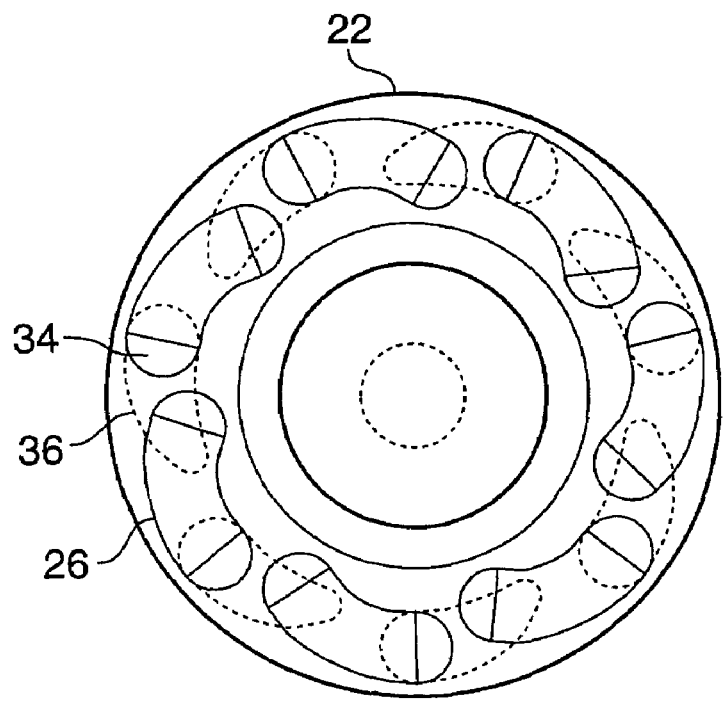
FIG. 9 shows a cross-section of the freewheel according to the third embodiment of the present invention showing the locking elements in engaged positions.

FIG. 9 shows the shape of the contoured wedge-shaped portions 26 and grooves 36. Here, the wedge-shaped portions 26 (indicated by the solid lines) are formed in the face of the driving member, and extend in a generally circumferential direction around the axis of rotation of the driving member.

In a preferred embodiment, the wedge-shaped portions 26 are disposed so that, when the locking element 34 is moving into the engaged position, the locking element is moved slightly radially outwards. This has the effect of providing a more positive locking action, as the locking elements 34 are assisted into the engaged position by the rotational motion of the driving member.

Figure 8:
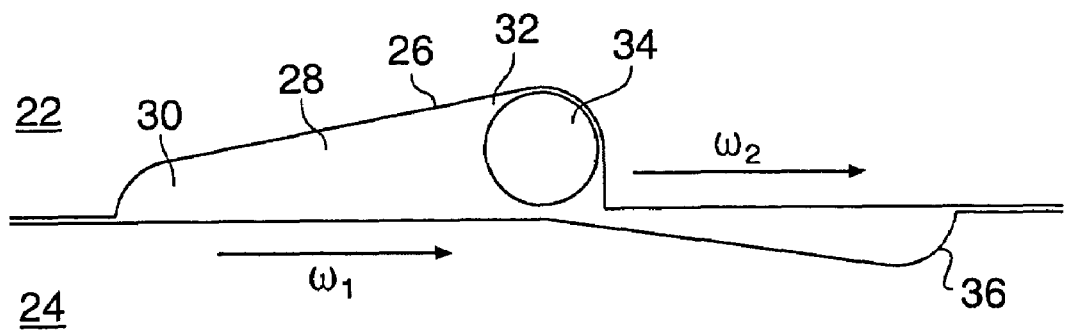
FIG. 8 is a simplified diagram of a freewheel according to the third embodiment of the present invention showing a locking element in a disengaged position between the driving and driven members.

When the rotational speed of the driven member is greater than the rotational speed of the driving member, i.e. when ω1>ω2, as indicated in FIG. 8, the freewheel 20 is unlocked, allowing the driven member to rotate freely of the driving member. Specifically, as the locking elements 34 are located in the deep ends 32, and the locking elements 34 have a diameter such that they are not able to be in contact with both the first race 22 and second race 24 whilst in the deep ends 32, the second race 24 is able to rotate freely with respect to the first race 22. Therefore, the locking elements 34 are in disengaged positions.

Figure 11:
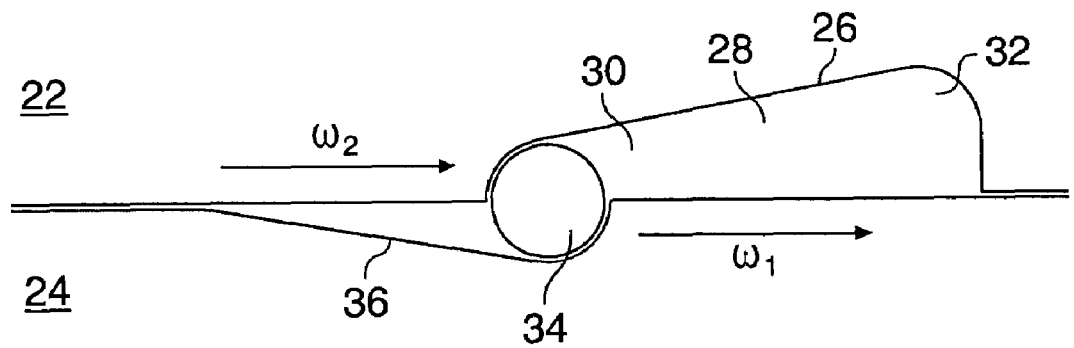
FIG. 11 is a simplified diagram of a freewheel according to the third embodiment of the present invention showing a locking element in an engaged position between the driving and driven members.
Figure 10:
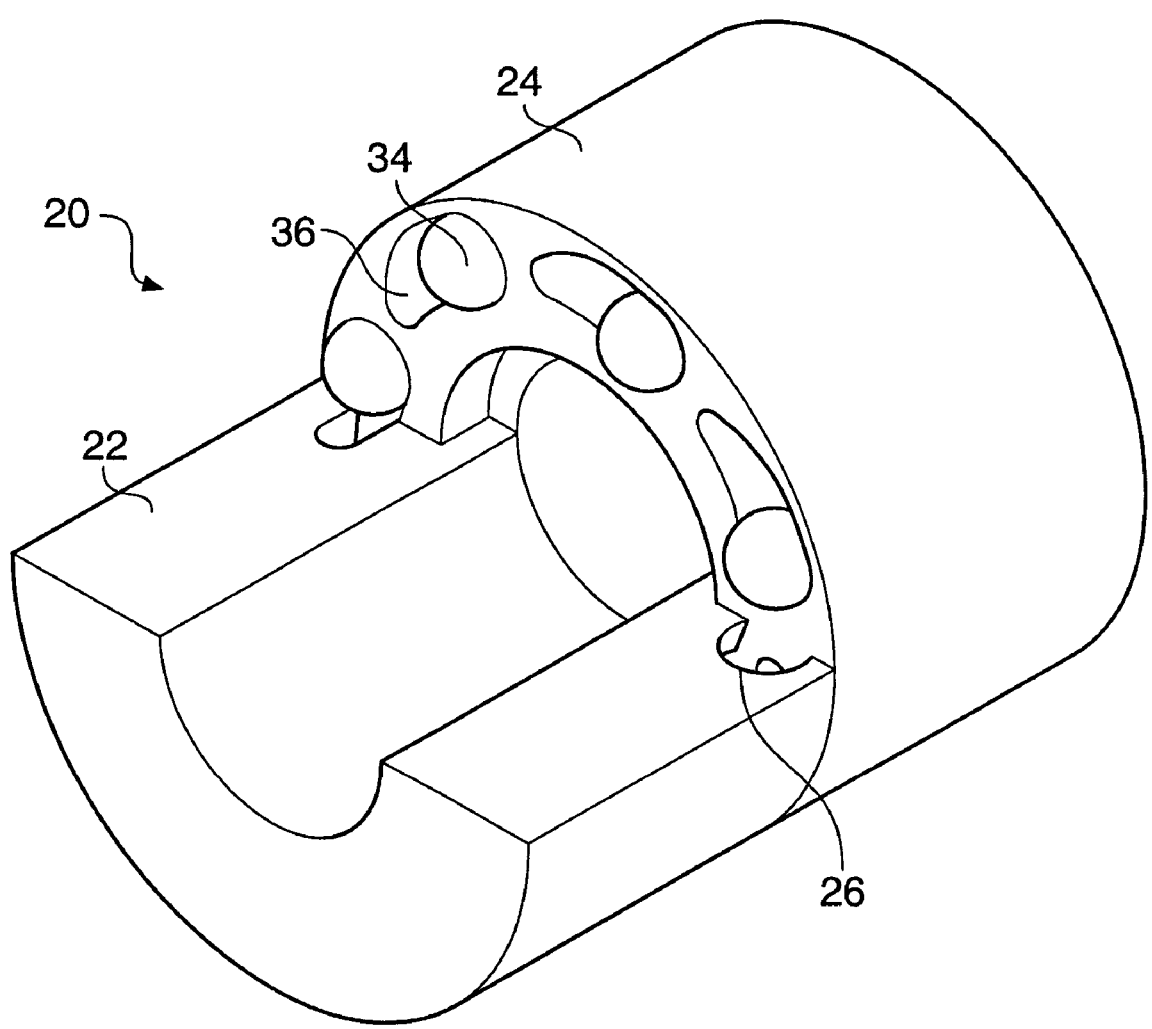
FIG. 10 is a perspective view of a freewheel according to the third embodiment of the present invention with a portion of the driving race removed to show the locking elements in engaged positions.

However, when the rotational speed of the driving member becomes greater than the rotational speed of the driven member, i.e. when ω2>ω1, as indicated in FIG. 11, the wedge-shaped portions 26 act on the locking elements 34 so that they are pushed towards the shallow ends 30 of their respective tapering spaces 28 and are forced into contact with the face of the second race 24. As the first race 22 and locking elements 34 rotate relative to the second race 24, the locking elements 34 will, upon reaching the depressions 36 in the face of the second race 24, be pushed into the depressions 36 by the wedge-shaped portions 26. The locking elements 34 are now held in engaged positions, as shown in FIGS. 9, 10 and 11, and the first race 22 and second race 24 are locked with the first race 22 and second race 24 rotating at the same speed. Therefore, when the freewheel 20 is locked, torque is transmitted through the locking elements from the driving member to the driven member.

When the driving torque reduces and the speed of rotation of the first race 22 decreases relative to the speed of rotation of the second race 24, the wedge-shaped portions 26 will no longer jam the locking elements 34 into the depressions 36. Therefore, each locking element 34 is released from its respective depression 36 and is accommodated with some play in the deep ends 32 of the respective tapering space 28, allowing the second race 24 to rotate freely of the first race 22. The freewheel 20 is now back in the unlocked position as shown in FIGS. 7 and 8.

There is therefore provided a freewheel device that locks quickly when a driving torque is applied, and which is less susceptible to slipping at high torques.

Figure 12:
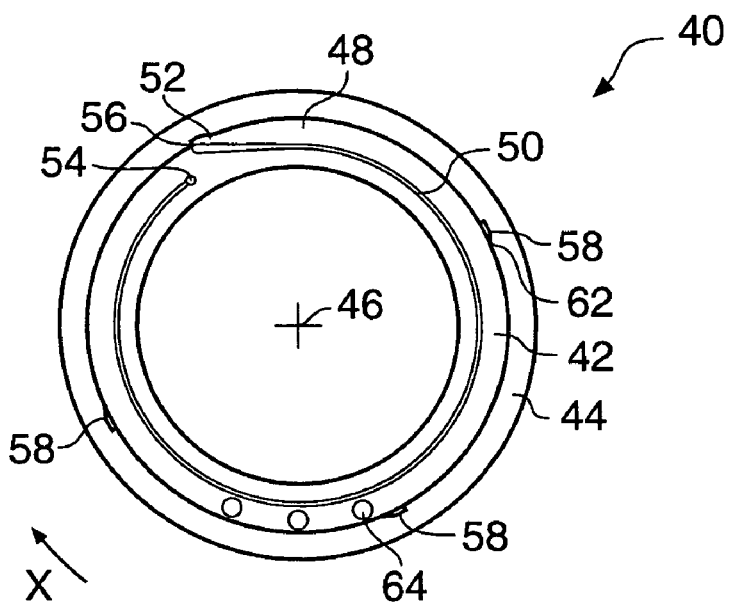
FIG. 12 shows a cross-section of a freewheel according to the fourth embodiment of the present invention showing a locking element in an engaged position.

A fourth preferred embodiment of a freewheel used in the downhole drilling tool is indicated generally at 40 in FIG. 12. The freewheel 40 comprises a first race 42 formed on the driving member of the drive means of the downhole tool, and a second race 44 formed on the driven member of the downhole tool. The first and second races 42, 44 are concentric with one another about a central axis of rotation 46.

The first race 42 is provided with an integral resilient latching member 48, which is formed by a slit 50 extending from an outer peripheral edge of the first race, circumferentially through the race. Thus, the latching member 48 has a free end 52, which is biased away from the outer periphery of the first race 42. The slit 50 terminates at the other end of the latching member in a circular aperture 54 extending in the axial direction of the race, which dissipates the stress at the end of the slit and substantially prevents the first race from failing due to fatigue. The free end 52 of the latching member has a driving face 56, which lies substantially in a radial plane of the freewheel.

The second race 44 is provided with at least one recess or notch 58, or preferably as shown, a plurality of recesses 58 equi-spaced about the inner circumference of the second race. The recesses 58 are asymmetric in shape, and are also formed on one side with a face 60 lying substantially in a radial plane of the freewheel. A ramped portion 62 extends away from the face 60. One or more axial holes 64 are provided through the first race 42, through which mud flow can pass.

In use, if the first race is travelling in a direction indicated by the arrow X, relative to the second race, then the latching member will spring into the recesses 58 and ride up the ramped portions 62. But if the second race is travelling in a direction indicated by the arrow X, relative to the second race, then the latching member will spring into the recesses 58 and the faces 56,60 will engage one-another, and drive is transferred from one race to the other.

In particular, if the second race was attached to the housing of a downhole motor, or the drillstring and was rotating slowly in the X direction, and the first race was attached to a drilling tool rotating more quickly in the X direction, the latching member of the freewheel 40 would not engage. However, if the drilling tool stopped, for example due to engagement with a rock formation, the second race would continue rotating and the latching member 48 would engage in the next recess 58. The faces 56,60 would abut one-another and drive would be transferred from the face 60 to the face 56.

Figure 13:
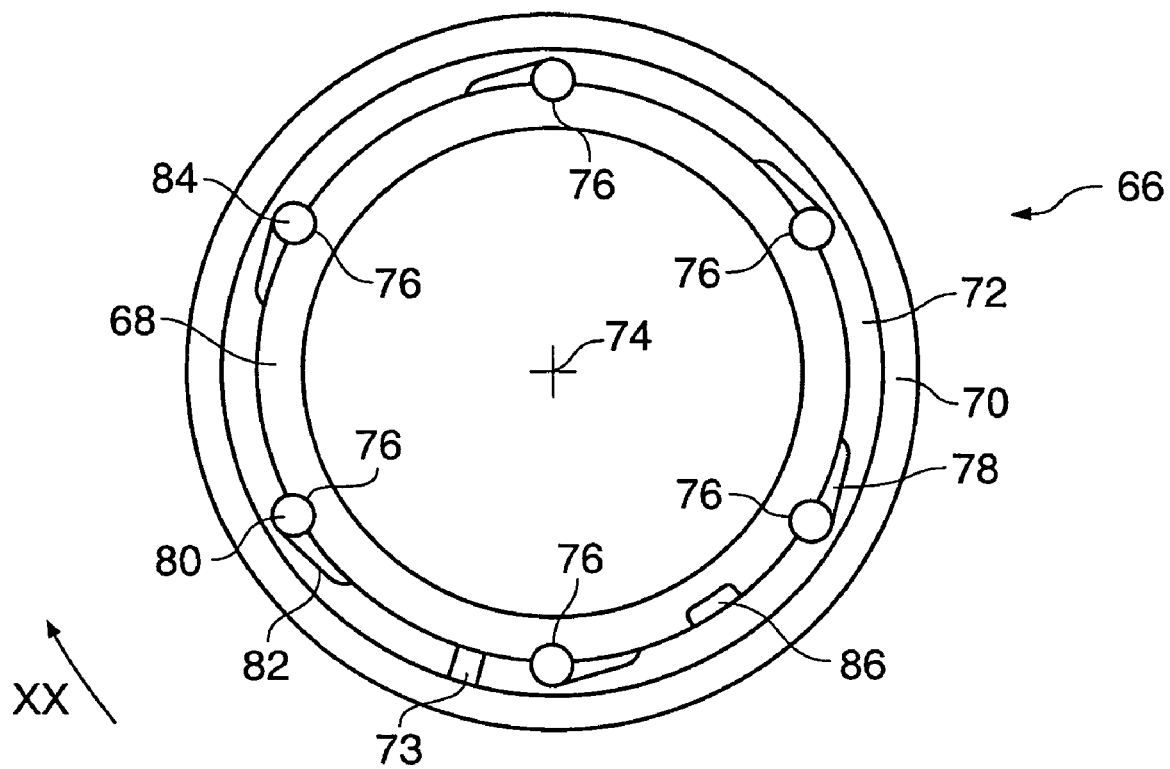
FIG. 13 shows a cross-section of a freewheel according to the fifth embodiment of the present invention showing the locking elements in a disengaged position.

A fifth preferred embodiment of a freewheel used in the downhole drilling tool is indicated generally at 66 in FIG. 13. The freewheel 66 comprises a first race 68 formed on the driving member of the drive means of the downhole tool, a second race 70 formed on a driven member of the downhole tool and a locking ring 72 interposed between the first and second races 68,70. The first and second races 68, 70 and the locking ring 72 are concentric with one another about a central axis of rotation 74. The locking ring 72 has a radial split 73, which allows for expansion and contraction of the locking ring, in use.

The first race 68 is provided with a plurality of semi-circular recesses 76, of which there are six shown in FIG. 13, equi-spaced around the outer periphery of the race. The locking ring 72 is provided with a corresponding number of recesses or notches 78 equi-spaced about the inner periphery of the locking ring. The recesses 78 are asymmetric in shape and have a substantially semi-circular portion 80 at one end. A ramped portion 82 extends away from the base of the semi-circular portion 80 sloping inwards, ie towards the first race 68. A ball or roller 84 is housed partly in each recess 76 of the first race 68, and partly in a corresponding recess 78 of the locking ring 72.

The circumferential faces between the first race 68, locking ring 72 and second race 70 can be provided with embellishments, for example, recesses, notches or nurling, which assist in locking them together, when they are in engagement with one-another. One or more axial holes 86 are provided through the first race 68, through which mud flow can pass.

In use, if the first race 68 is travelling in a direction indicated by the arrow XX, relative to the second race 70, then each ball or roller 84 will simply rotate in the recesses 76,78 and the first race will freewheel. However, if the second race 70 is travelling in a direction indicated by the arrow XX, relative to the first race 68, then each ball or roller 84 will ride up the ramped portion 82 of the recess 78 in which it is located, causing the locking ring 72 to be forced outwards into contact with the second race 70. Furthermore, the ball or roller is held in the recess in the first ring, preventing rotational movement between the first ring and locking ring. Therefore, the first race 68 and locking ring 72 are engaged by means of the or each ball or roller 84, the locking ring 72 and second race 7 engage one-another by frictional contact, and drive is transferred from one race to the other.

If the relative rotation between the races 68,70 changes back to that first described, then each ball or roller 84 will move down the ramped portion 82 of the recess 78 in which it is located, allowing the locking ring 72 to contract, and the races to freewheel.

It should be understood that the freewheel 66 could function with only one ball or roller 84 with corresponding recesses 76,78, but the torque transfer would be limited and there would be a danger of slipping and/or damage of the freewheel. In the preferred arrangement shown in FIG. 13, the combined effect of six balls or rollers 84 ensures a smooth operation and high torque transfer without slippage. It should also be appreciated that in an alternative embodiment, not shown, the first race could be the outer race, and the locking ring could be forced into engagement with the inner ring.

Figure 14:
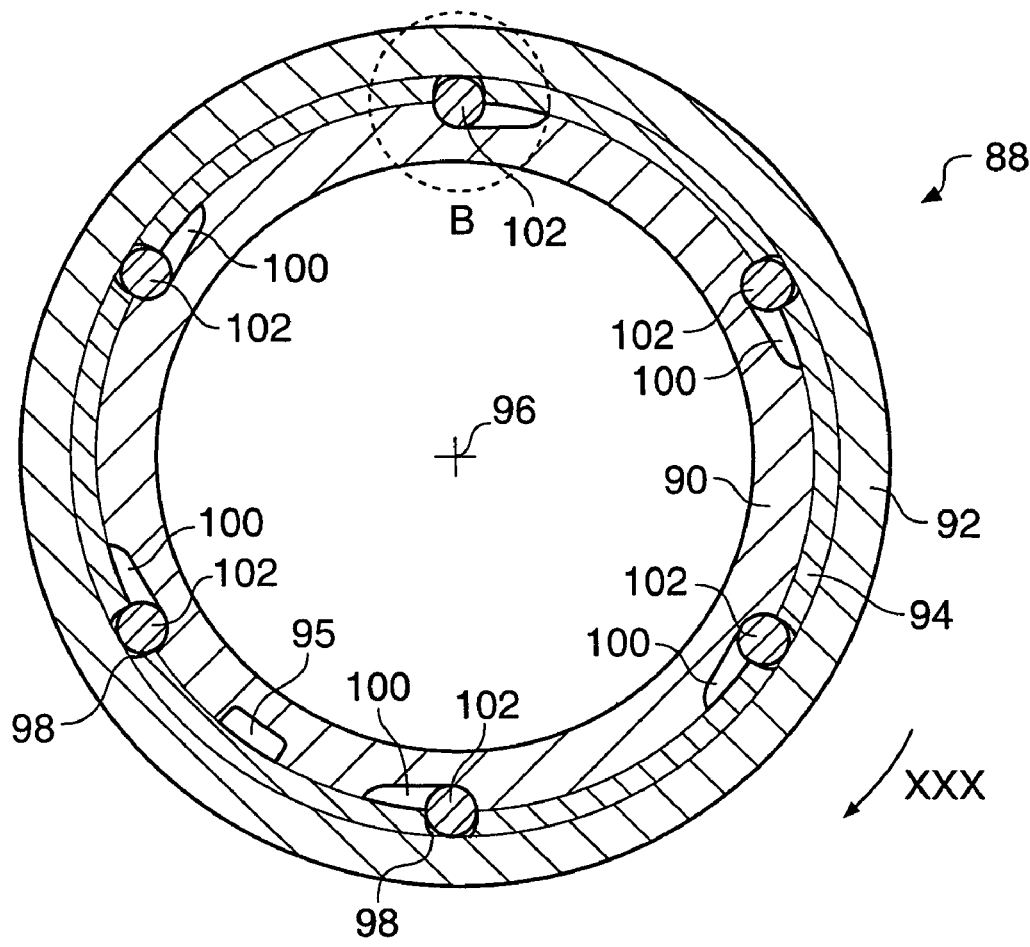
FIG. 14 shows a cross-section of a freewheel according to the sixth embodiment of the present invention showing the locking elements in a disengaged position.

A sixth preferred embodiment of a freewheel used in the downhole drilling tool is indicated generally at 88 in FIG. 14. The freewheel 88 comprises a first inner race 90 formed on the driving member of the drive means of the downhole tool, a second outer race 92 formed on a driven member of the downhole tool and a guide ring 94 interposed between the first and second races 90,92. The first and second races 90,92 and the guide ring 94 are concentric with one another about a central axis of rotation 96. In this embodiment, the guide ring 94 is not split, because it does not need to expand or contract in the operation of the freewheel, but has a plurality of equi-spaced apertures or longitudinal slots 98, six as shown.

The first race 90 has a corresponding number of equi-spaced recesses 100 in its outer periphery, which are asymmetric or ramped. A ball or roller 102 sits partly in each of the recesses 100 and partly in the corresponding and radially aligned aperture or slot 98 in the guide ring 94. If rollers 102 and slots are utilised, the slots 98 ensure that the rollers remain radially aligned and do not tend to skew whilst making contact with the inner circumference of the second race 92.

Figure 14A:
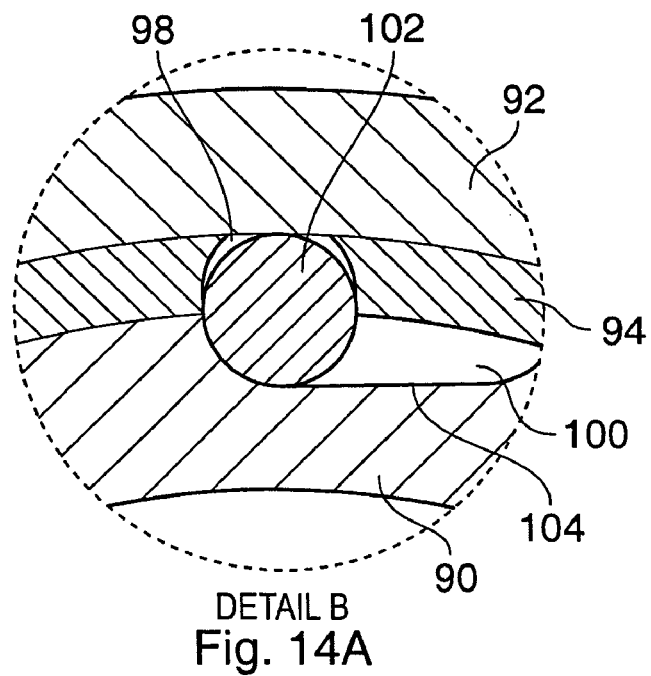
FIG. 14A shows an enlarged cross-section of the area indicated with the reference B in FIG. 14.
Figure 14B:
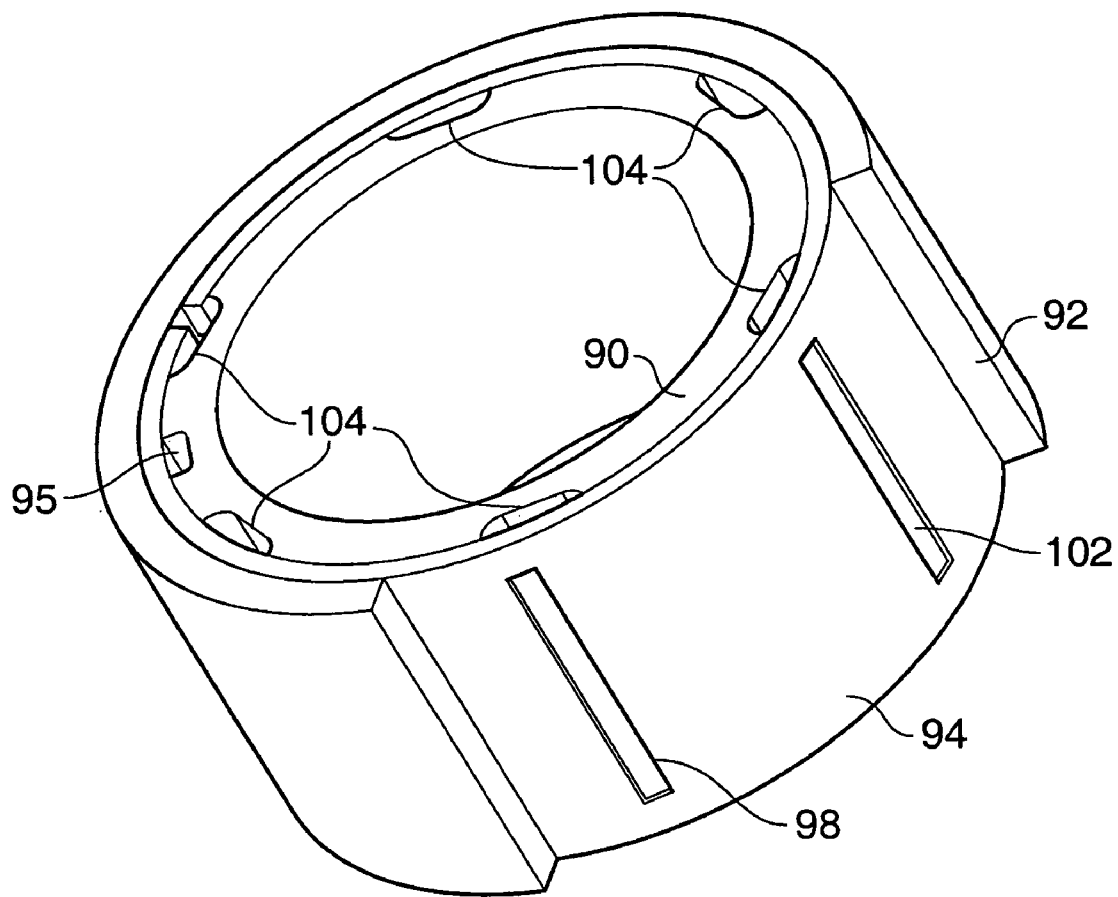
FIG. 14B shows a perspective view of the freewheel shown in FIGS. 14 and 14A, with the outer race partly cut-away to show the guide ring.

Referring also to FIGS. 14A and 14B, each ramped recess 100 has a base 104 which extends more deeply into the first race at one end than at the other. In FIG. 14A, the recess is deeper at the left hand end, as viewed. The arrangement in FIG. 14B, with the second race 92 partly cut away for the purpose of illustration, utilises rollers, not balls. One or more axial holes 95 are provided through the first race 42, through which mud flow can pass.

In use, if the first race 90 is travelling in the direction indicated by the arrow XXX, relative to the second race 92, then each ball or roller 102 will rotate in its respective recess 100 and slot 98 and the first race will free wheel. However, if the second race 92 is travelling in the direction indicated by the arrow XXX relative to the first race 90, then each ball or roller 102 will ride up the base 104 of the recess, causing the ball or roller 102 to be forced into locking engagement between the first and second races 90 and 92. In this way, drive is transferred from one race to the other. If the relative rotation between the races 90, 92 changes back to that first described, then each ball or roller 102 will move down the ramp base 104, thus releasing the second race 92 from the first race 90, and allowing the races to free wheel again.

Figure 15:
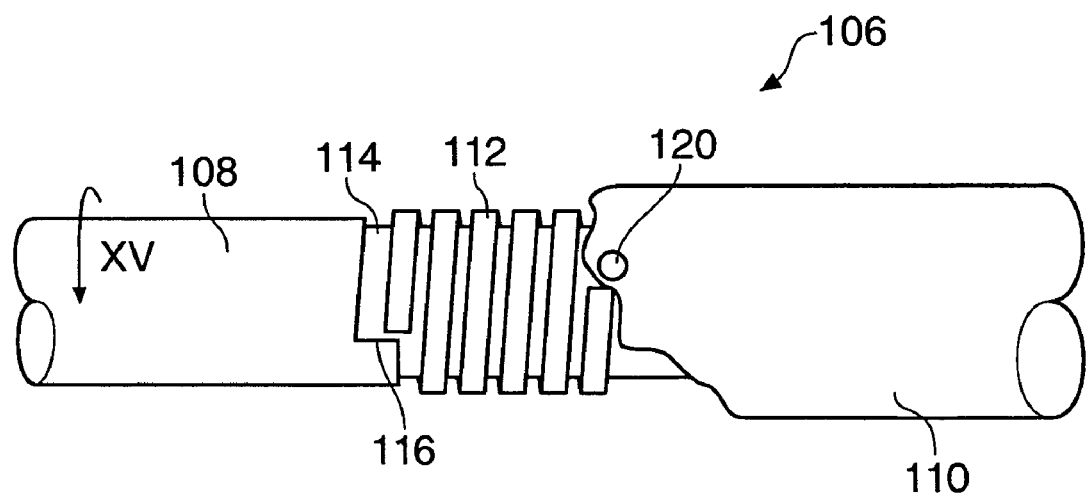
FIG. 15 shows a side view of a freewheel, according to the seventh embodiment of the present invention with the housing partly cut-away to show the locking element in a disengaged position.

A seventh preferred embodiment of freewheel used in the downhole drilling tool is indicated generally at 106 in FIG. 15. The freewheel 106 comprises a shaft 108 mounted for rotation inside a housing 110, which is substantially a cylinder. A coil or spring 112 is mounted about the shaft 108 inside the housing 110, on a portion 114 of the shaft or reduced diameter. The reduced diameter portion 114 terminates at one end in a shoulder 116 having a face in a radial plane of the shaft 108. The shoulder 116 engages a first free end 118 of the coil 112, as will be described below. A notch or inwardly extending pin 120 is provided on the inner circumstance of the housing 110 which can be engaged by the second free end 122 of the coil or spring. The axial distance between the shoulder 116 and the notch or pin is sufficient to the coil spring to have some axial float.

In use, when the shaft 108 is rotating in the direction as indicated by the arrow XV relative to the housing 110, the second free end 122 of the coil 112 rides over the notch or pin 120, and the shaft 108 free wheels. In the case of the pin 120, the axial float of the coil or spring 112 allows it to move away from the pin 120 towards the shoulder 116. However, when the housing 110 is rotating in the direction XV relative to the shaft 108, ie the housing is rotating faster than the shaft, the pin or notch 120 engages the second free end 122 of the coil spring 112 and the first free end 118 engages the shoulder 116 thus transferring drive thereto. The spring or coil 112 expands, thus gripping the inside of the housing 110. The portion 114 of the shaft 108 of reduced diameter may also be tapered.

In this embodiment, the housing 110 corresponds to a part of the drillstring, and the shaft 108 corresponds to a part of the drilling head assembly. Fluid flow can pass through the helical coils.

Figure 16:
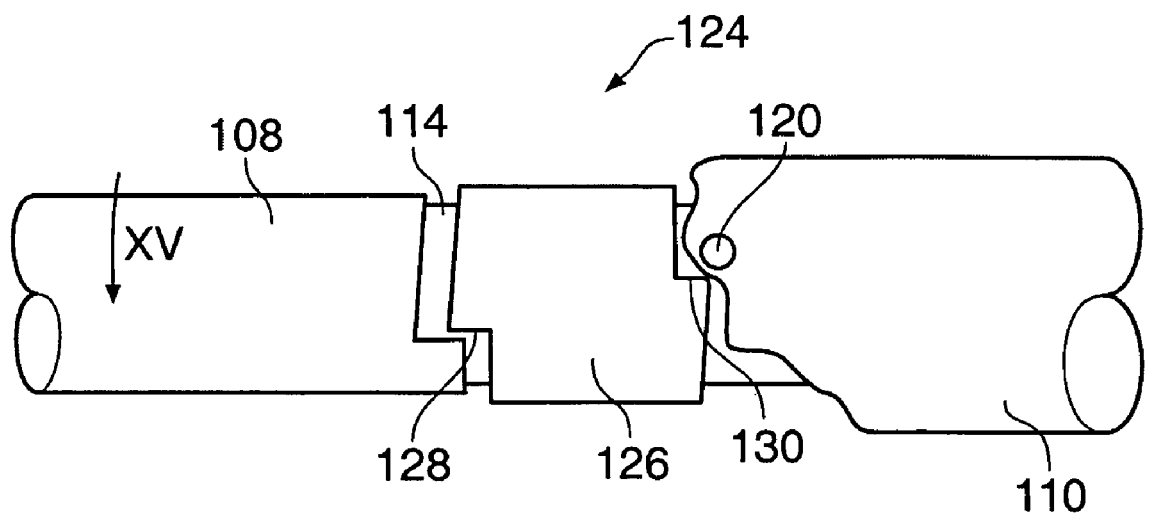
FIG. 16 shows a side view of a freewheel, according to the eighth embodiment of the present invention with the housing partly cut away to show the locking element in a disengaged position.

An eighth preferred embodiment of a freewheel used in the downhole drilling tool is indicated generally at 124 in FIG. 16. This embodiment is substantially the same as that of FIG. 15, save that the coil or spring 112 is replaced by a cylinder 126 mounted on the portion of reduced diameter 114 of the shaft 108. The cylinder 126 is stepped at its ends, to provide radial faces 128, 130, which engage the shoulder 116 and the pin 120 (The pin cannot be replaced by a notch in this embodiment).

In use, the freewheel 124 operates in the same way as the freewheel 106, but when the housing 110 is rotating in the direction XV relative to the shaft 108, ie, the housing is rotating faster than the shaft, the pin 120 engages the radial face 130 of the cylinder and the radial face 128 of the cylinder engages the shoulder 116, thus transferring drive.

Figure 17:
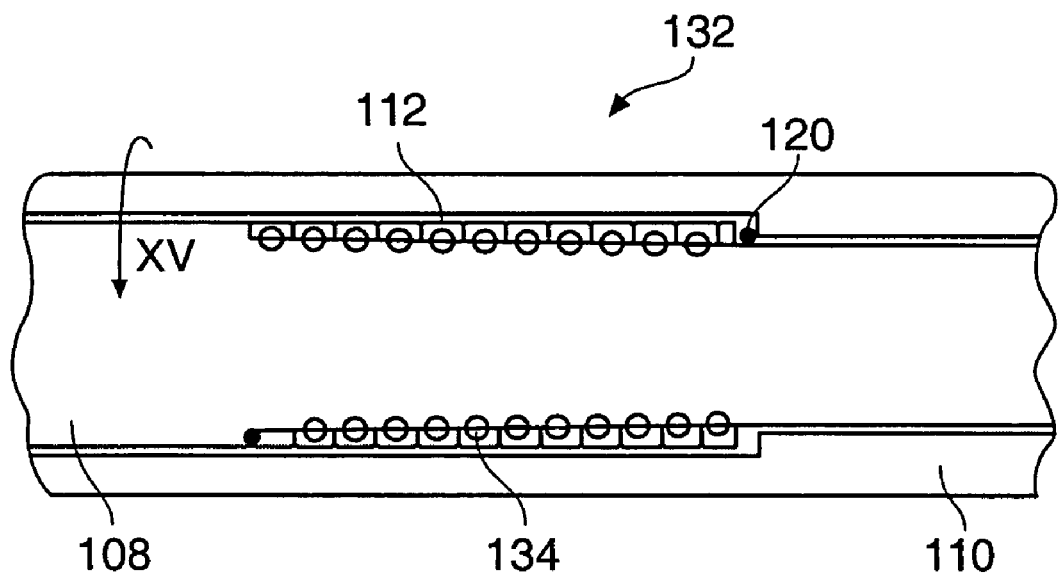
FIG. 17 shows a cross-section of a freewheel according to the ninth embodiment of the present invention showing the locking elements in a disengaged position.

A ninth preferred embodiment of the freewheel used in the downhole drilling tool is indicated generally at 132 in FIG. 17. This embodiment is the same as that shown in FIG. 15, save that the coil 112 is mounted on ball bearings 134, which are received in tracks on the reduced diameter portion of the shaft 108 and similar tracks provided on the internal circumference of the coil. The operation of the freewheel 132 is substantially the same as that described with regard to the freewheel 106.

The invention claimed is:

1. A downhole drilling tool comprising a drillstring and a drilling head, wherein a freewheel for transferring drive from the drillstring to the drilling head is positioned between the drillstring and the drilling head, the freewheel comprising:
   a first race;
   a second race; and
   a locking element interposed between said first and second races;
   one of said races having a wedge-shaped depression upon which the locking element moves between a disengaged position in which the first race is disengaged from the second race and an engaged position in which the locking element locks the first and second races together, and the other of said races having a depression formed in a surface thereof, the depression being shaped to receive at least a portion of the locking element when the locking element is in the engaged position;

wherein the wedge-shaped depression is formed in an end face of the first race, and the depression is formed in an end face of the second race.

2. A downhole drilling tool as claimed in claim 1, wherein said other of said races has a plurality of depressions formed in the surface thereof.

3. A downhole drilling tool as claimed in claim 2, wherein said one of said races has a plurality of wedge-shaped depressions, and the freewheel further comprises a plurality of locking elements interposed between the first and second races.

4. A downhole drilling tool as claimed in claim 1, wherein the locking element is a ball bearing.

5. A downhole drilling tool as claimed in claim 1, wherein the depression is a groove that extends in a generally circumferential direction relative to the axis of rotation of the driven member.

6. A downhole drilling tool as claimed in claim 1, wherein the wedge-shaped depression is curved in a generally circumferential direction relative to the axis of rotation of the driving member.

7. A downhole drilling tool as claimed in claim 1, wherein the depression is a hole.

8. A downhole drilling tool as claimed in claim 1, wherein the depression is a recess.

9. A downhole drilling tool as claimed in claim 3, wherein the number of depressions is greater than the number of locking elements.

10. A downhole drilling tool as claimed in claim 1, wherein the driven member is able to rotate freely when the locking element is in a disengaged position, and the driving and driven members are engaged when the locking element is in an engaged position in which the locking element is jammed into the depression by the wedge-shaped depression.

* * * * *